United States Patent [19]

Kobayashi et al.

[11] Patent Number: 5,438,872
[45] Date of Patent: Aug. 8, 1995

[54] MEASURING METHOD AND APPARATUS USING A LAMB WAVE

[75] Inventors: Katsuyuki Kobayashi, Yokohama; Atsushi Tanaka, Kawasaki; Yuichiro Yoshimura, Kamakura; Kiyoshi Kaneko; Masaki Tokioka, both of Yokohama, all of Japan

[73] Assignee: Canon Kabushiki Kaisha, Tokyo, Japan

[21] Appl. No.: 900,324

[22] Filed: Jun. 18, 1992

[30] Foreign Application Priority Data

Jun. 21, 1991 [JP] Japan .................. 3-150046
Jun. 21, 1991 [JP] Japan .................. 3-150047

[51] Int. Cl.⁶ .................. G01H 5/00; G01N 29/18
[52] U.S. Cl. .................. 73/597; 73/12.01; 73/602; 73/DIG. 1
[58] Field of Search .................. 73/579, 597, 643, 632, 73/865.3, 12.01, 12.08, 602, 615, 599, 598, DIG. 1

[56] References Cited

U.S. PATENT DOCUMENTS 4,429,575  2/1984  Akishika .................. 73/598
5,035,144  7/1991  Aussel .................. 73/602

FOREIGN PATENT DOCUMENTS

60-001553  5/1985  Japan .
63-175712  11/1988  Japan .
1525455  11/1989  U.S.S.R. .
1569534  6/1990  U.S.S.R. .................. 73/597
1631410  2/1991  U.S.S.R. .................. 73/597

Primary Examiner—Hezron E. Williams
Assistant Examiner—Rose M. Finley
Attorney, Agent, or Firm—Fitzpatrick, Cella, Harper & Scinto

[57] ABSTRACT

An apparatus for measuring a thickness of plate material includes a plate material whose thickness is to be measured, a vibration pen to generate a plate wave by applying a vibration to the plate material, a vibration sensor which is disposed at an arbitrary position on the plate material and detects the plate wave which has propagated on the plate material, an extracting circuit to extract different frequency components of the plate wave detected by the vibration sensor, a timer to measure arrival times to the vibration sensor of the signals of the different frequency components extracted by the extracting circuit, and a controller to obtain a thickness of the plate material on the basis of the arrival times measured by the timer and the frequency components corresponding thereto. The extracting circuit is a band pass filter.

4 Claims, 12 Drawing Sheets

MEASURING METHOD AND APPARATUS USING A LAMB WAVE

BACKGROUND OF THE INVENTION

1. Field of the Invention

The invention relates to measuring method and an apparatus for measuring a thickness of a plate material such as plate glass, iron plate, aluminum plate, or the like.

2. Description of the Related Background Art

Hitherto, as an apparatus for measuring a thickness of plate material, there are known a simple measuring apparatus for actually measuring a thickness by using a micrometer, a caliper, or the like, a measuring apparatus for optically measuring a thickness by using a laser beam or the like, an apparatus for measuring a thickness by using an ultrasonic wave or the like, and the like.

The above conventional measuring apparatuses, however, have the following drawbacks.

First, in the apparatus for measuring by using a micrometer, a caliper, or the like, only the portion around the plate as an object to be measured can be accurately measured and, for instance, in case of a plate material having a wide area, the measurement of the plate thickness of the central portion cannot help becoming the relative measurement. In other words, in such a measurement by the micrometer or the like, a reference surface is first specified, a plate material as an object to be measured is put on the reference surface, and a distance between the upper surface of the plate and the reference surface is measured, thereby measuring a thickness of the plate material. In such a case, when the plate material as a measuring object is distorted or warped, a gap occurs between the lower surface of the plate material and the reference surface in dependence on the location of the plate material. When such a gap occurs, the measured plate thickness differs from the actual plate thickness, so that the measurement may not be accurate.

On the other hand, in the case of the optical measuring apparatus using the laser beam or the like, the apparatus itself is expensive and its handling is also complicated. In the case of the apparatus for calculating the plate thickness by a path difference of the reflected lights between the upper surface and the lower surface of the plate by using a laser beam, the measuring object obviously must be a transparent plate, so that the application of such an apparatus is limited. On the other hand, there is a method whereby a laser beam is irradiated to a plate which is not transparent from each of the upper and lower surfaces and the plate thickness is measured on the basis of the reflected lights from the upper and lower surfaces. Such a method, however, has a problem such that the operations such as an adjustment of the optical axis and the like are complicated and the plate thickness cannot be easily measured.

According to the method of measuring a plate thickness by using an ultrasonic wave, a time which is required from a time point at which an acoustic wave is generated from a signal generating source and enters the plate material as a measuring object to a time point at which the acoustic wave is reflected by the bottom surface of the plate and is returned is measured, thereby calculating the plate thickness. According to such a method, however, as the plate thickness decreases, a time difference which is caused until the irradiated ultrasonic wave signal is reflected by the bottom surface and returned is reduced, so that when a thickness of thin plate is measured, it is difficult to accurately measure such a return time. To solve the above problem, there is used a method of increasing a resolution by raising a frequency of the ultrasonic wave signal which enters the plate or the like. However, any of those methods has limits and the costs of the apparatus itself are also high.

SUMMARY OF THE INVENTION

The invention is made in consideration of the above conventional examples, and it is an object of the invention to provide a measuring method and an apparatus which can easily measure a thickness of plate material by low costs.

Another object of the invention is to provide a method and an apparatus in which a lamb wave vibration applied to a plate material is detected, different frequency components of the vibration are extracted, and a thickness of plate material is measured from an arrival time to a sensor of the signal of each frequency component.

Still another object of the invention is to provide a method and an apparatus in which lamb wave vibrations of different frequencies which have time sequentially applied to a plate material are detected and a thickness of plate material is measured from the arrival time to a sensor of the signal of each frequency component.

DETAILED DESCRIPTION OF THE PREFERRED EMBODIMENTS

[First embodiment]

The preferred first embodiment of the invention will be described in detail hereinbelow with reference to the drawings.

Figure 1:
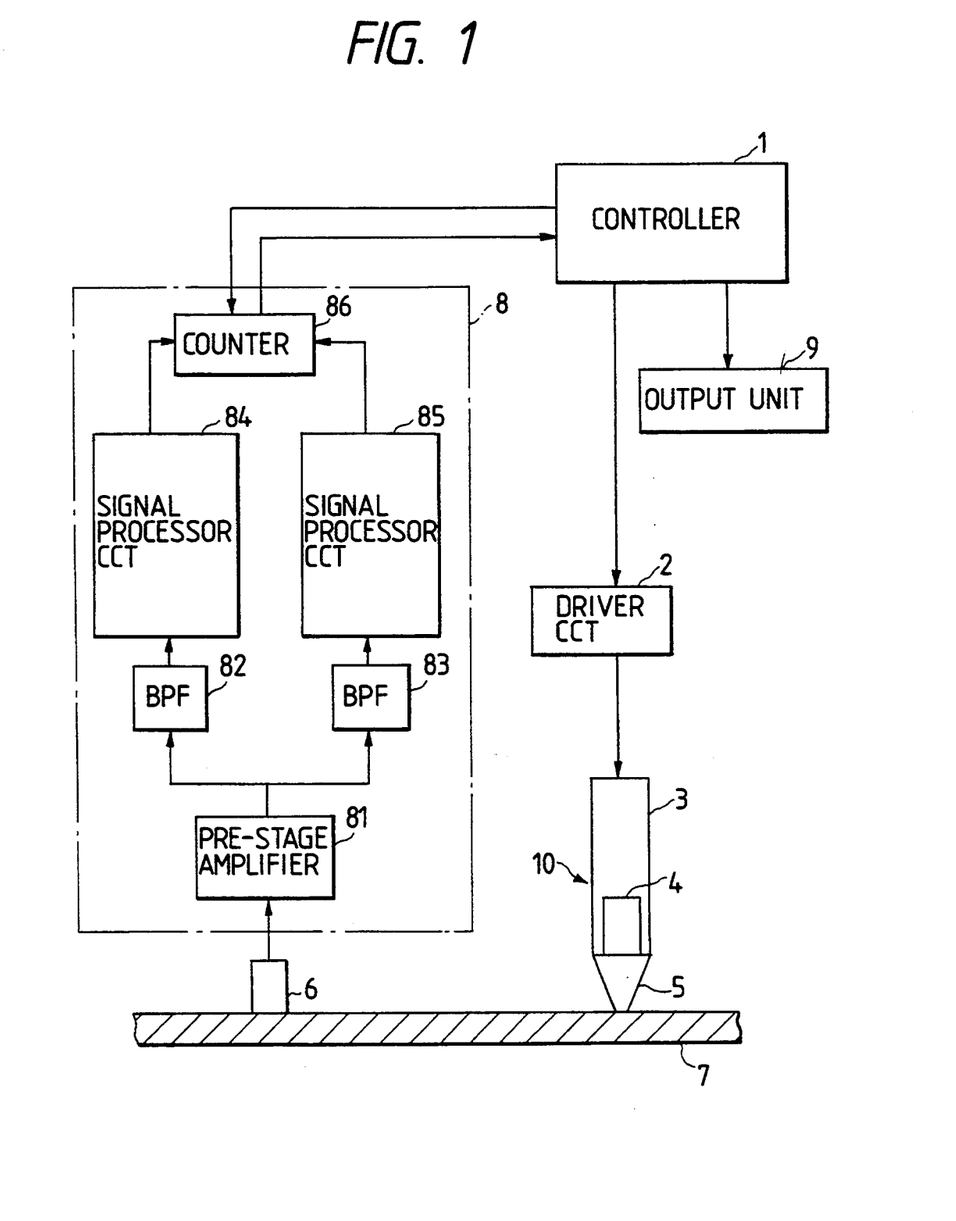
FIG. 1 is a block diagram showing a schematic construction of a plate thickness measuring apparatus according to the first embodiment.

FIG. 1 is a block diagram showing a schematic construction of a plate thickness measuring apparatus of the first embodiment.

In FIG. 1, reference numeral 1 denotes a controller for controlling the entire measuring apparatus and for measuring a thickness of plate material 7 as an object to be measured. Reference numeral 2 denotes a driver circuit for receiving a driving signal from the controller 1 and for driving a vibration output actuator 3 of a vibration pen 10. The actuator 3 has therein a vibrator 4 comprising a piezoelectric transducer or the like, and an electric driving signal which is supplied from the driver circuit 2 is converted into a mechanical ultrasonic vibration by the vibrator 4. The ultrasonic vibration is transferred to the plate material 7 as a measuring object through a horn portion 5 having a sharp tip. Consequently, the ultrasonic vibration which has propagated on the plate material 7 is detected by a vibration sensor 6 comprising a mechanical/electric converting element such as a piezoelectric element or the like. An output signal of the vibration sensor 6 is supplied to a waveform detecting circuit 8 and converted into a detection signal which can be processed by the controller 1. The controller 1 calculates a thickness of plate material 7 on the basis of the result of the process by the waveform detecting circuit 8. Reference numeral 9 denotes an output unit to display or print and generate the result of the above measurement.

A method of obtaining the plate thickness will now be described in detail hereinbelow.

Figure 2:
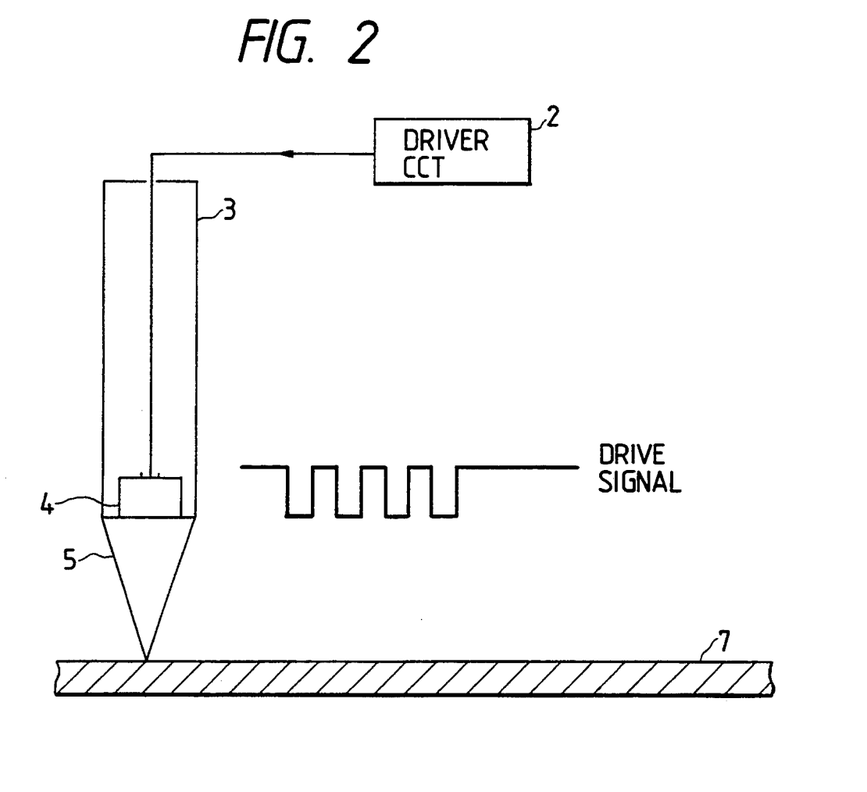
FIG. 2 is a diagram showing an example of a driving waveform of a vibrator in the first embodiment.

FIG. 2 shows a vibrator driving waveform to drive the vibrator 4 in the vibration pen 3.

Figure 3:
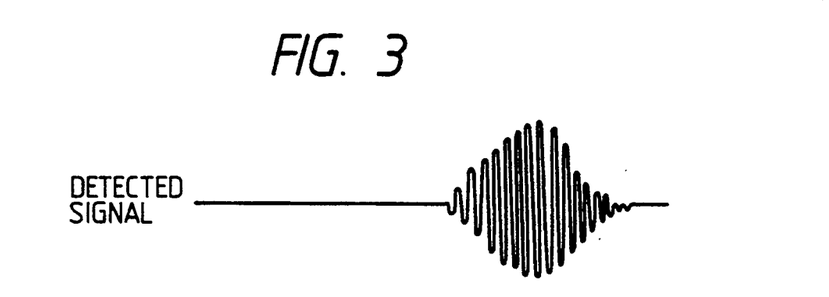
FIG. 3 is a diagram showing an example of a detected signal waveform of a vibration sensor in the first embodiment.

As shown in FIG. 2, according to the embodiment, the vibrator driver circuit 2 receives a rectangular wave pulse train having a predetermined length by the vibrator 4 at a predetermined period. The vibrator 4 vibrates by the driving signal and the electric driving signal is converted into the mechanical energy. The vibration is transferred as an elastic wave vibration on the plate material 7 and is detected by the vibration sensor 6 provided similarly on the plate material 7. The electric energy supplied to the vibrator 4 by the driver circuit 2 as mentioned above is converted into the mechanical energy by the vibrator 4 and is again converted into the electric energy by the vibration sensor 6 through the plate material 7 and is generated. FIG. 3 shows an example of a signal waveform detected by the vibration sensor 6.

Figure 4:
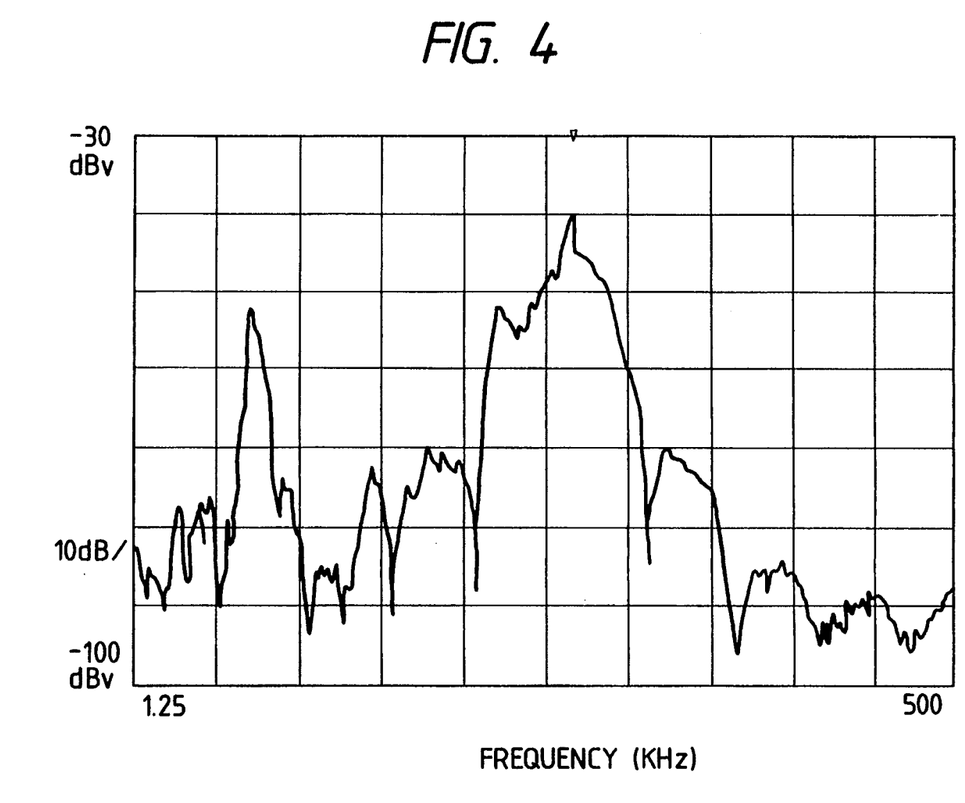
FIG. 4 is a diagram showing an example of a signal spectrum of a detection signal detected by the vibration sensor in the first embodiment.

The signal which has been converted from the electric signal to the mechanical energy and subsequently from the mechanical energy to the electric signal, namely, the signal which is detected by the vibration sensor 6, doesn't exhibit a spectrum of a single frequency as shown in FIG. 4. This is because each section of the vibration pen 10 including the vibrator 4, horn portion 5, and the like has a peculiar vibrating frequency as compared with the frequency of the electric driving signal supplied to the vibrator 4, so that a mechanical response doesn't have a single frequency and those portions respond in various vibrating mode. In the vibrator 4, since the horn portion 5 and the like function as loads, the vibration of the vibrator 4 is dumped and the mechanical energy of a wide band as a whole is generated from the tip of the vibration pen 4. Therefore, the electric signal which is detected and generated by the vibration sensor 6 has a synthetic wave in which various frequency components are mixed.

In FIG. 4, an axis of abscissa indicates a frequency (kHz) and an axis of ordinate indicates a gain (3 dB). A peak value is equal to −40.83 dBV at 250 kHz.

Figure 5:
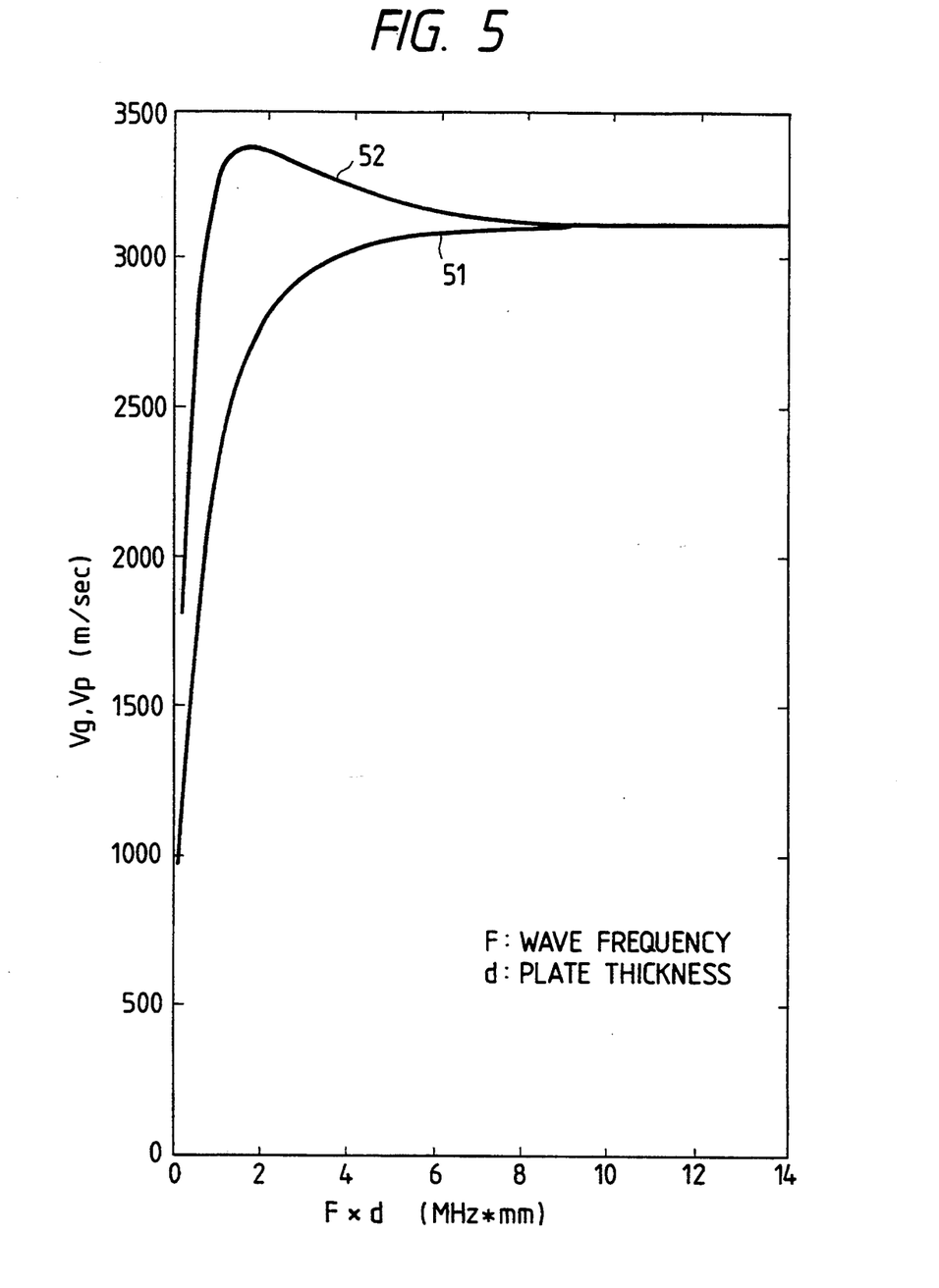
FIG. 5 is a diagram for explaining general characteristics of a plate wave.

FIG. 5 is a diagram showing general characteristics of an elastic wave (plate wave) which propagates on the plate material. Reference numeral 51 denotes $V_p$ (phase velocity) and 52 indicates $V_g$ (group velocity).

As will be obviously understood from FIG. 5, it is well known that when the quality of plate material is equal, the phase velocity $V_p$ and group velocity $V_g$ of the lamb wave depend on the product of a thickness d of the plate material and a frequency F of the wave.

As mentioned above, since the lamb wave which propagates on the plate material 7 is dumped, its lamb wave signal has a frequency band wider than that of the electric driving signal (FIG. 2). Therefore, the signal waveform which is detected by the vibration sensor 6 is as shown in FIG. 4, that is, when comparing on the time base, the head portion of the signal waveform is constructed by a wave having a high propagating speed and a relatively high frequency, the lamb wave of a low frequency gradually arrives at the vibration sensor 6 and is converted into the electric signal with the elapse of the time and is multiplexed to the wave of a high frequency which has already reached and the resultant multiplexed signal is generated.

Therefore, by paying attention to the difference between the frequencies of the lamb waves, the waveform of the detection signal detected by the vibration sensor 6 is processed through band pass filters having different center frequencies, thereby obtaining a thickness of plate material. Explanation will now be described in detail hereinbelow.

The same electric signal generated from the vibration sensor 6 in case of a predetermined plate thickness is transmitted and processed through band pass filters (BPFs) of different center frequencies. The group velocities $V_g$ (thousand m/sec) in the respective cases are obtained from the relations between the arrival delay times of the waves and the distance between the vibration pen 4 and the vibration sensor 6. The results are shown in FIG. 6.

Figure 6:
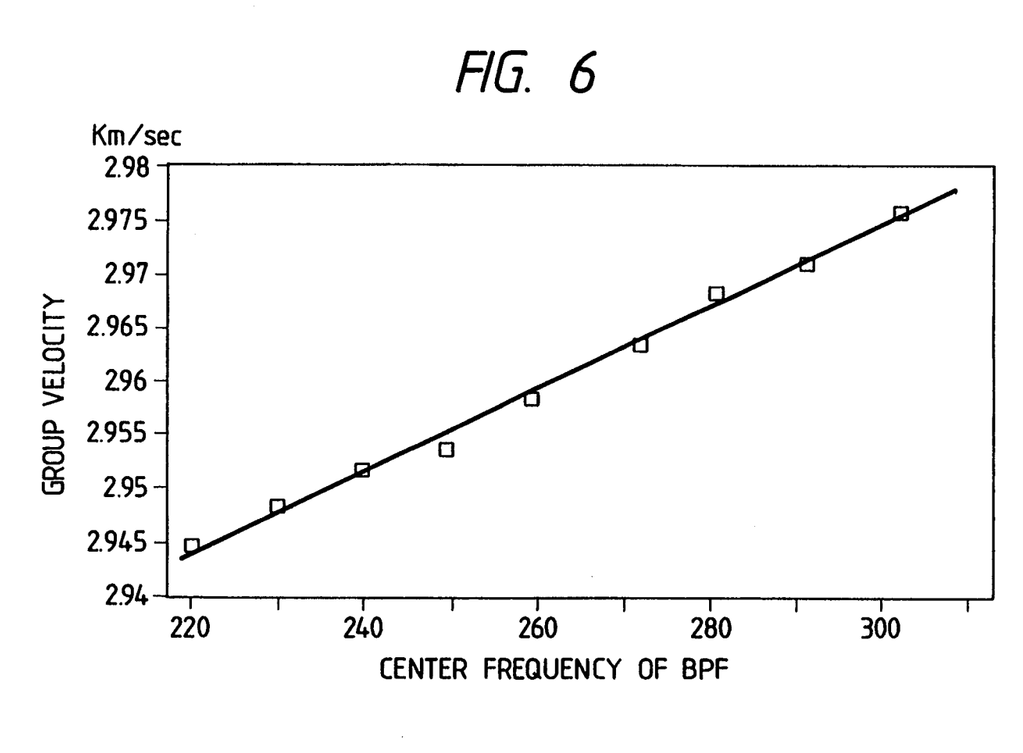
FIG. 6 is a diagram showing the relation between the center frequency of a band pass filter and the group velocity of a plate wave in the first embodiment.

As will be obviously understood from FIG. 6, as the center frequency of the BPF is high, the group velocity $V_g$ is high. As the center frequency of the BPF is low, the group velocity $V_g$ is low. Therefore, even if the signals which are detected and generated by the vibration sensor 6 are equal, by transmitting and processing the same signal through the band pass filters having different center frequencies, the lamb wave of a special velocity corresponding to the center frequency can be detected.

A construction of the wave form detecting circuit 8 to detect such group velocities and to measure the plate thickness will now be described.

In FIG. 1 of the embodiment, the measuring apparatus uses a band pass filter 82 and a band pass filter 83 whose center frequency is different from that of the BPF 82 and processes the signal which is generated from the vibration sensor 6. After the output signal from the vibration sensor 6 was amplified by a pre-stage amplifier 81, it is supplied to the BPFs 82 and 83. It is now assumed that a group velocity and a frequency of the wave which are calculated by the signal waveform processed by using the BPF 82 are respectively set to $V_{g1}$ and $f_1$ and that a group velocity and a frequency of the wave which are calculated by the signal waveform processed by the BPF 83 are respectively set to $V_{g2}$ and $f_2$.

It is now assumed that a group delay time which is caused until the ultrasonic wave vibration which has been generated from the actuator 3 and propagated on the plate material 7 reaches the vibration sensor 6 and is processed by the BPF 82 and is detected is set to $T_{g1}$ and a group velocity which is detected by the BPF 83 is set to $T_{g2}$. When the group velocities are approximated by FIG. 6, $$V_{gn} = \alpha(f_n \times d) + \beta \quad (1)$$

where, n=1, 2
d: thickness of plate material 7
α, β constants

Now, assuming that a distance between the vibration output actuator 3 and the vibration sensor 6 is set to L, L is obtained by using the group delay times ($T_g$) and group velocities ($V_g$) which are measured.

$$L = V_{g1} \cdot t_{g1} = V_{g2} \cdot t_{g2} \quad (2)$$

From the relation of the equation (1), $$\{\alpha(f_1 \times d) + \beta\} t_{g1} = \{\alpha(f_2 \times d) + T_{g2} \quad (3)$$

By solving the equation (3) with respect to the plate thickness d, $$d = (\beta/\alpha) \times \{(t_{g2} - t_{g1}) / (f_1 \cdot t_{g1} - f_2 \cdot t_{g2})\} \quad (4)$$

By respectively detecting the group delay times of the lamb waves of different velocities by using a principle such that the velocity of the wave (lamb wave) which propagates on the plate depends on the vibrating frequency, the plate thickness can be easily measured.

In addition to the control of the measuring apparatus, the controller 1 can also calculate the plate thickness of the measuring object by executing the above calculations and can display or print the result to the output unit 9 and can also generate the result to the external apparatus.

Figure 7:
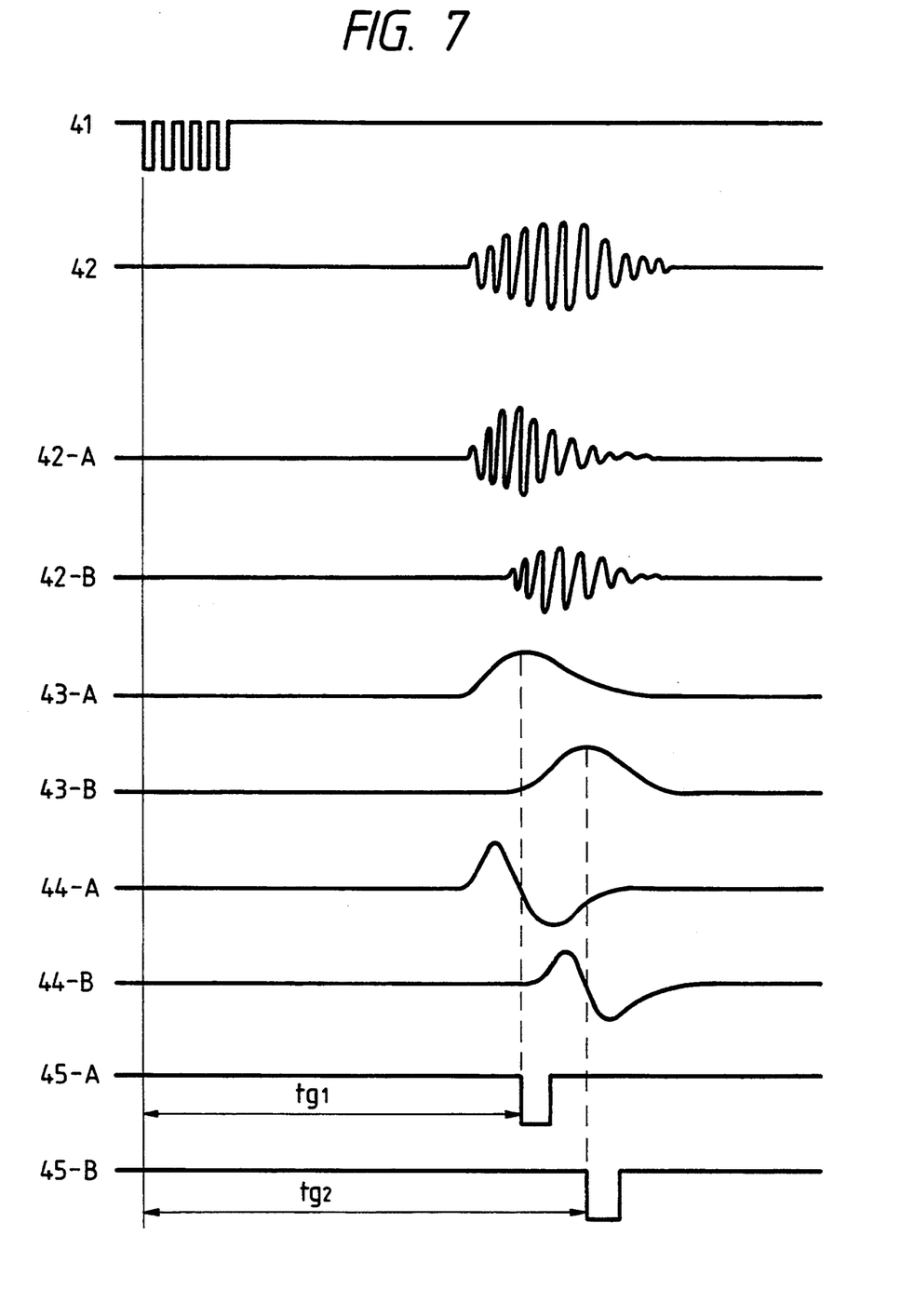
FIG. 7 is a time chart showing signal processes in a waveform detecting circuit in the first embodiment.

FIG. 7 is a timing chart showing timings of the signal processes which are executed in the signal detecting circuit 8.

In the diagram, reference numeral 41 denotes a driving waveform to drive the vibrator 4 in the vibration pen 10 and 42 indicates a detected signal waveform when the vibration which has propagated on the plate material 7 as a measuring object is detected by the vibration sensor 6. Reference numerals 42-A and 42-B denote signal waveforms after the detected signal waveforms were processed by the BPFs 82 and 83, respectively; 43-A and 43-B indicate envelopes of the detected signal waveforms; and 44-A and 44-B represent differentiated waveforms of the envelopes 43-A and 43-B, respectively. The envelopes are differentiated in order to determine the delay times of the vibration waves detected by the vibration sensor 6. The peak of each envelope is detected by the zero-cross signal (corresponding to the peak of the envelope). The above processes are executed by signal processing circuits 84 and 85. When each signal processing circuit detects the peak of the envelope, it generates a count stop signal to a counter 86.

The counter 86 is constructed by two counters. The counter 86 starts the counting operation at a time when the controller 1 generates a driving signal to the driver circuit 2 and starts the driving of the vibrator 4. The counter stops the counting operation by peak detection signals from the signal processing circuits 84 and 85. Therefore, by reading a count value of the counter 86 by the controller 1, the time which is required from a time point at which the vibration is generated from the vibration pen 10 to a time point at which the vibration sensor 6 detects the vibration can be obtained.

As mentioned above, on the basis of the peak signal of the envelopes of the detection signal waveforms, the waveform detecting circuit 8 supplies the group delay times $t_{gn}$ to the controller 1 as count values of the counter 86.

Figure 8:
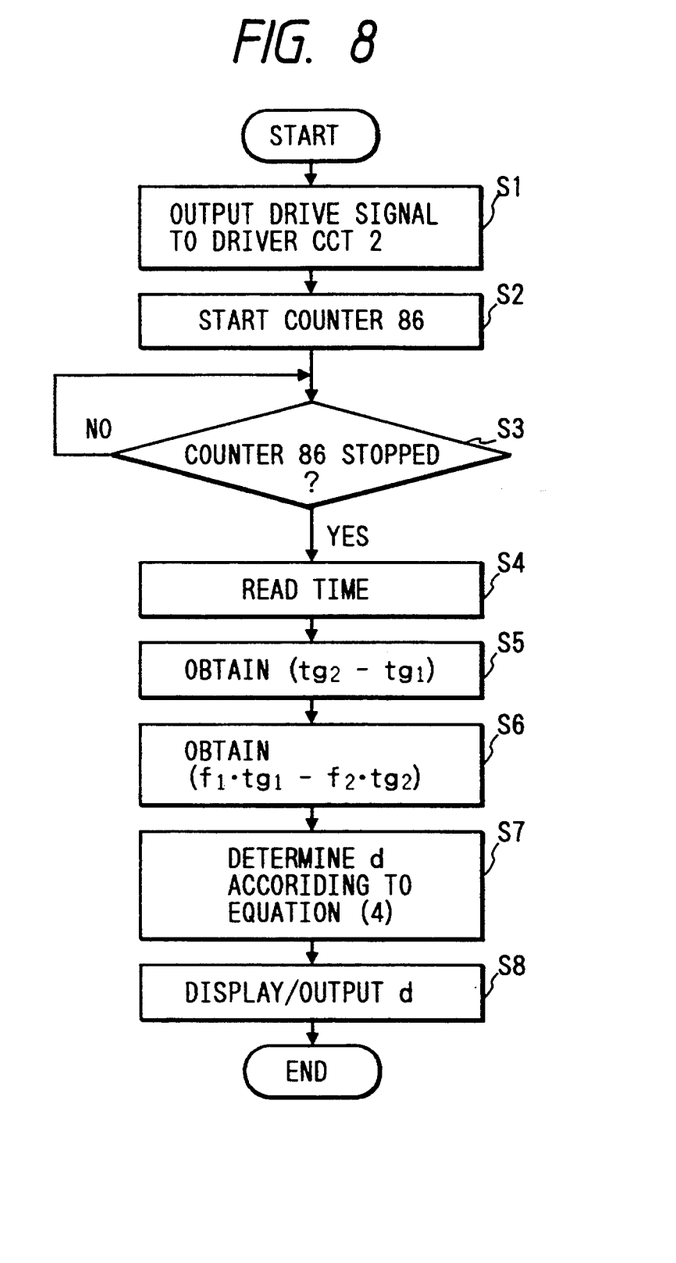
FIG. 8 is a diagram showing a plate thickness measuring process by a controller of a plate thickness measuring apparatus according to the first embodiment.

FIG. 8 is a flowchart showing plate thickness measuring processes in the controller 1 according to the first embodiment. A control program to execute such processes has been stored in an ROM (not shown) or the like in the controller 1.

In the plate thickness measuring processing routine, the driving signal to drive the vibrator 4 is first supplied to the driver circuit 2 in step S1. The counter 86 is also activated in step S2 and the counting operation is started. In step S3, the apparatus waits for the stop of the counting operation of the counter 86. When the counter 86 finishes the counting operation, step S4 follows and the count value at that time is read. The count values which are read as mentioned above correspond to the times which are required until the peak values of the signals which have been transmitted through the BPFs 82 and 83 are detected and are expressed by $t_{g1}$ and $t_{g2}$, respectively.

In step S5, a difference ($t_{g2} - t_{g1}$) between those time data is calculated. In step S6, the center frequencies ($f_1$, $f_2$) of the band pass filters (82 and 83) are multiplied with the elapsed times ($t_{g1}$, $t_{g2}$) corresponding to them, thereby obtaining the group velocities ($f_1 \cdot t_{g1} \cdot t_{g2}$) corresponding to the frequencies. By substituting the times and group velocities obtained as mentioned above into the equation (4), the thickness of plate material 7 as a measuring object is obtained. The processing routine advances to step S8 and the calculated plate thickness is supplied to the output unit 9 and is displayed or printed.

The invention can be applied to a system which is constructed by a plurality of apparatuses or to an apparatus comprising one apparatus. The invention can also be obviously applied to the case where the invention is accomplished by supplying a program to execute the processes specified by the invention to a system or an apparatus.

According to the first embodiment as described above, since the distance between the actuator 3 and the vibration sensor 6 can be measured without calculating the plate thickness, there is no need to strictly set the distance between them. Consequently, since the actuator 3 and vibration sensor 6 can be set to arbitrary positions of the measuring object, there is a generality and there are also effects such that the construction of the apparatus is simple and can be realized by low costs.

[Second embodiment]

The preferred second embodiment of the invention will now be described in detail hereinbelow with reference to the drawings.

Figure 9:
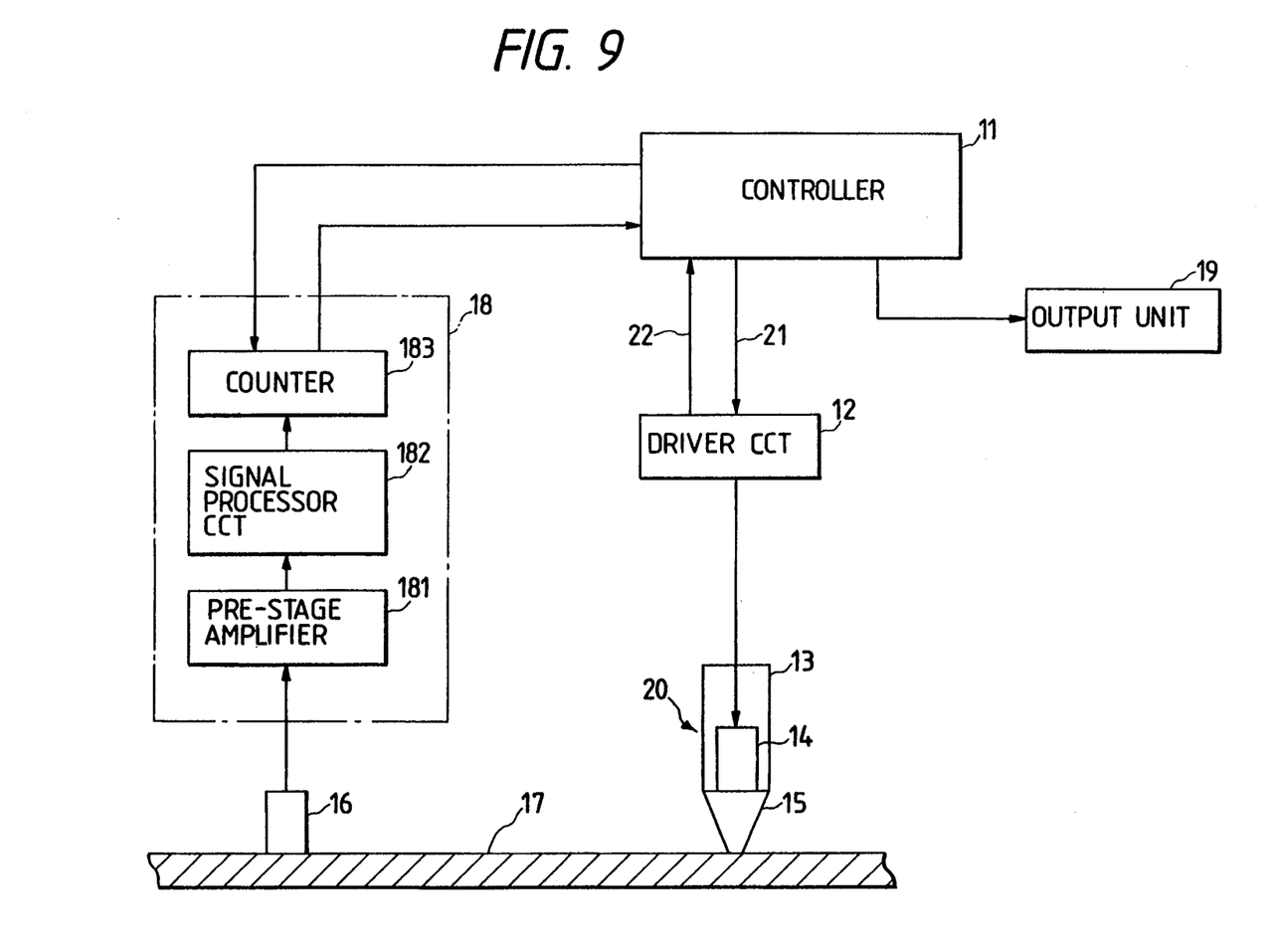
FIG. 9 is a block diagram showing a schematic construction of a plate thickness measuring apparatus according to the second embodiment.

FIG. 9 is a block diagram showing a schematic construction of a plate thickness measuring apparatus of the second embodiment.

In FIG. 9, reference numeral 11 denotes a controller to control the entire measuring apparatus and to measure a thickness of plate material 17 as an object to be measured. Reference numeral 12 denotes a driver circuit for receiving a driving signal from the controller 11 and for driving a vibration output actuator 13 of a vibration pen 20. The actuator 13 has therein a vibrator 14 comprising a piezoelectric transducer or the like and the electric driving signal which is supplied from the driver circuit 12 is converted into the mechanical ultrasonic vibration by the vibrator 14. The ultrasonic vibration is transferred to the plate material 17 as a measuring object through a horn portion 15 having a sharp tip. Due to this, the ultrasonic vibration which has propagated on the plate material 17 is detected by a vibration sensor 16 comprising a mechanical/electric converting element such as a piezoelectric element and the like. An output signal of the vibration sensor 16 is supplied to a waveform detecting circuit 18 and is converted into a detection signal which can be processed by the controller 11. On the basis of the result processed by the waveform detecting circuit 18, the controller 11 calculates a thickness of plate material 17.

Reference numeral 19 denotes an output unit to display or print and generate the result of the measurement.

A method of obtaining the plate thickness will now be described in detail hereinbelow.

Figure 10:
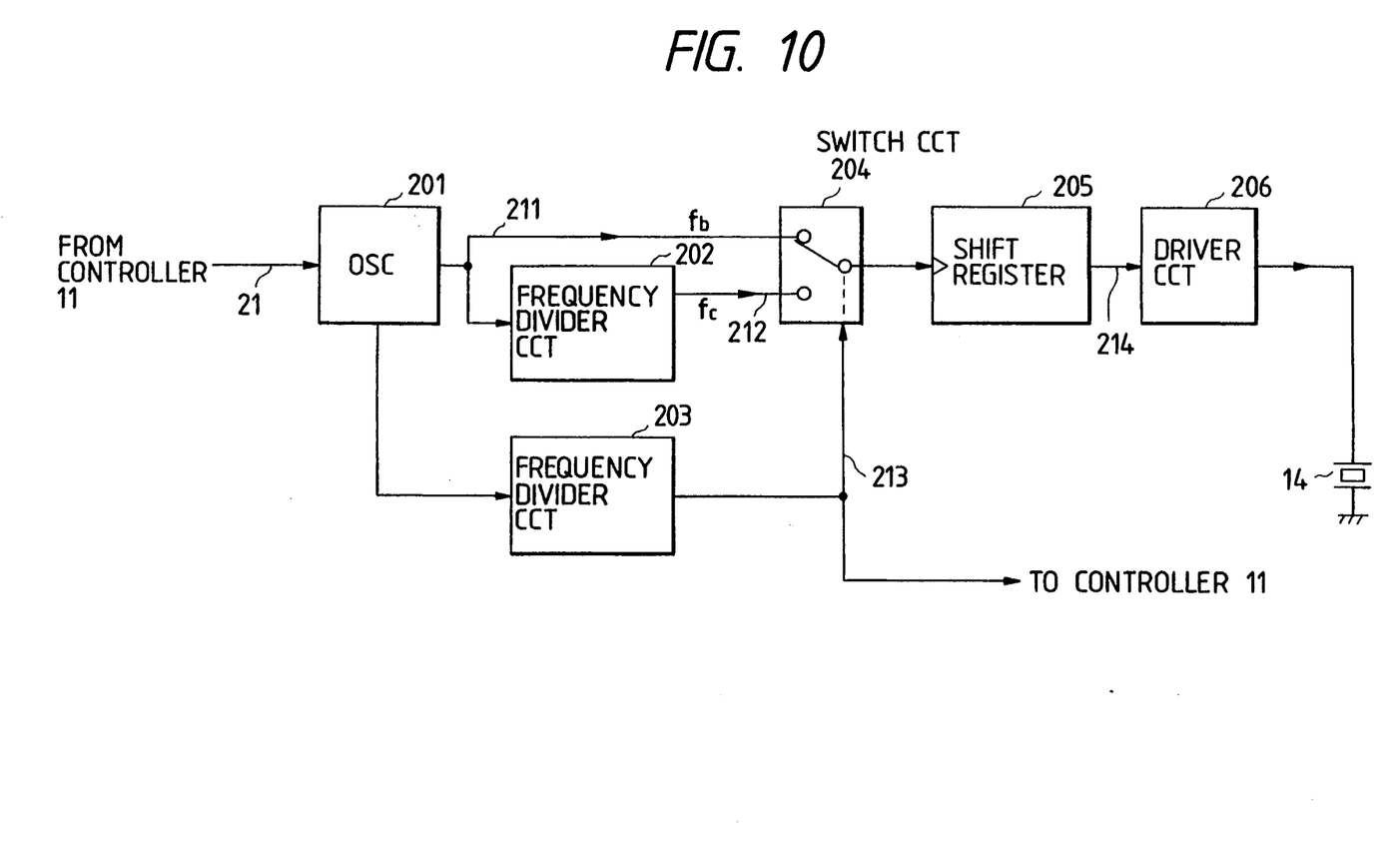
FIG. 10 is a block diagram showing a construction of a driver circuit of a vibrator in the second embodiment.
Figure 11:
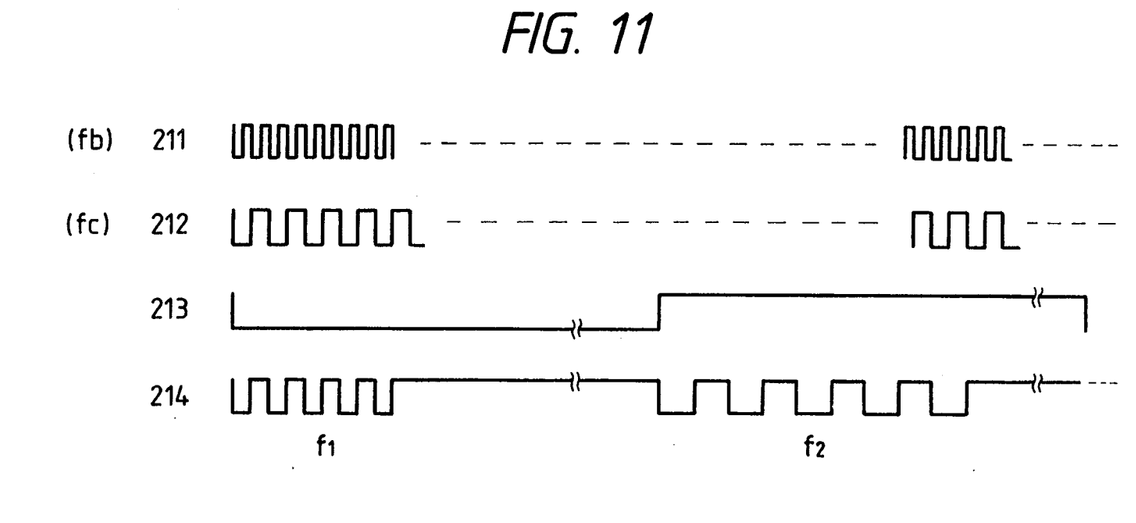
FIG. 11 is a diagram showing an example of a detected signal waveform in each section of the driver circuit shown in FIG. 10.

FIG. 10 is a block diagram showing a practical construction of the vibrator driver circuit 12 to drive the vibrator 14 in the vibration pen 13. FIG. 11 is a timing chart.

In FIG. 10, a clock signal generated from an oscillator (OSC) 201 is frequency divided by a frequency divider circuit 202 and converted into a frequency signal of a frequency $f_b$ (211 in the timing chart of FIG. 11). After that, it is supplied to a switch circuit 204 to switch between frequency signals $f_b$ (211) and $f_c$ (212). The clock signal $f_b$ generated from the OSC 201 is frequency divided by another frequency divider circuit 203 and converted into a clock signal shown at 213 in the timing chart of FIG. 11. The switch circuit 204 is switched by the clock signal 213. The clock signals of the frequencies $f_b$ and $f_c$ are alternately selected and supplied to a shift register 205. The shift register 205 is constructed so as to generate a pulse train of the number of a few periods (five periods in the case of the second embodiment) just after the clock signal 213 changed. The frequency of such a pulse train 214 depends on the frequencies $f_b$ and $f_c$.

As shown in the timing chart of FIG. 11, consequently, clocks of frequencies $f_1$ and $f_2$ shown by the clock signal 214 are alternately generated from the shift register 205 just after a clock signal 213 changed. A driver circuit 206 converts the clock signal 214 generated from the shift register 205 into the electric signal level which is optimum to drive the vibrator 14. In case of the second embodiment, the clock signal 214 drives the vibrator 14 as a rectangular wave pulse train. However, no problem occurs even when a size wave or the like is used as a waveform of such a driving signal.

The oscillator 201 starts the oscillation by a signal 21 which is supplied from the controller 11. The signal 213 which is generated from the frequency divider circuit 203 is sent to the controller 11. Thus, the controller 11 can detect the output timing of the signal from the driver circuit 206 shown in the timing chart of FIG. 11. In this manner, the start of the counting operation of a counter 183 of the waveform detecting circuit 18, which will be explained hereinlater, can be instructed.

The vibration of the vibrator 14 generated as mentioned above is given to the plate material 17 via the horn portion 15 and propagates as an elastic wave vibration on the plate material 17 and is detected by the vibration sensor 16. As mentioned above, the electric energy supplied to the vibrator 14 is converted into the mechanical energy by the vibrator 14 and is again converted into the electric energy by the vibration sensor 16 through the plate material 17 as a measuring object and is generated.

In the second embodiment, the arrival delay times of the lamb wave of the first frequency ($f_1$) and the lamb wave of the second frequency ($f_2$) different from the first frequency are measured, thereby calculating the plate thickness.

As mentioned above, the group delay times of the waves of different velocities are respectively detected by using a principle such that the velocities of the waves (lamb waves) which propagate on the plate material 17 depend on the frequency, so that the thickness of plate material can be easily measured.

In addition to the control of the measuring apparatus, the controller 11 calculates the plate thickness by executing the above-mentioned calculations and displays the result or generates the result to an external apparatus.

Figure 12:
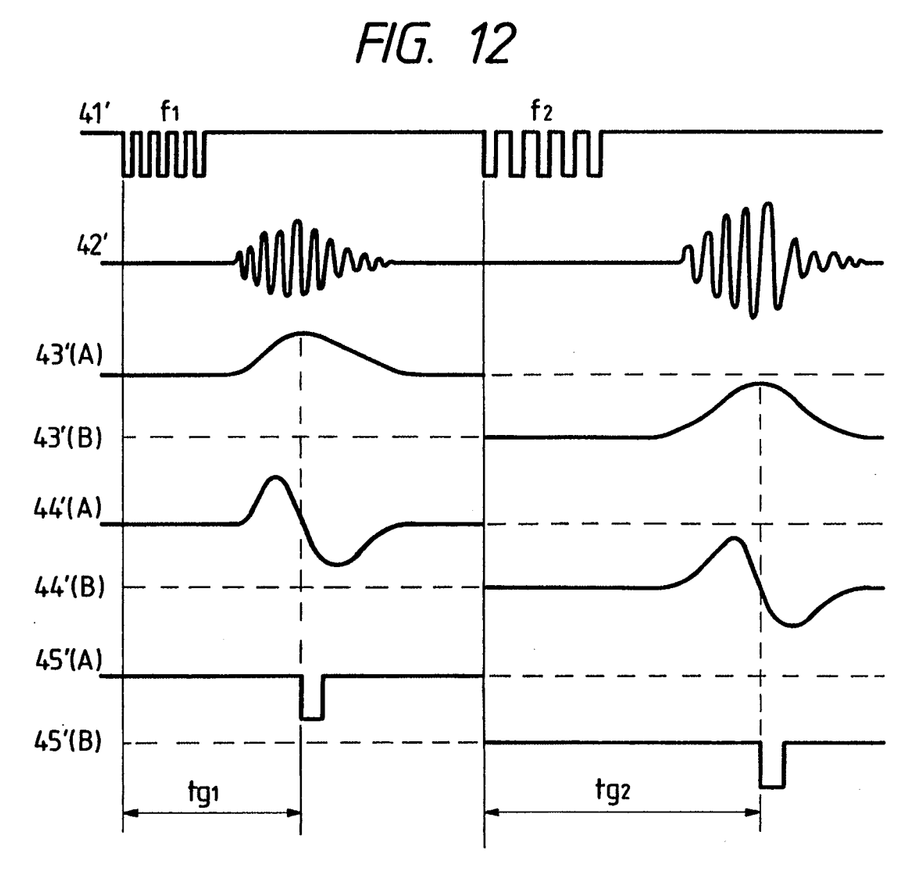
FIG. 12 is a time chart showing signal processes in a waveform detecting circuit on the basis of the relation between the driving signal waveforms of different frequencies and the group velocities of the lamb wave corresponding thereto in the second embodiment.

FIG. 12 is a time chart of the signal processes which are executed in the signal detecting circuit 18.

In FIG. 12, reference numeral 41' denotes a driving waveform (214 in FIGS. 10 and 11) to drive the vibrator 14 of the vibration pen 20. Reference numeral 42' denotes a detected signal waveform when the vibration which has propagated on the vibration propagating plate is detected by the vibration sensor 16. Reference numerals 43' (A) and 43' (B) denote envelopes of the detected signal waveform 42' and 44' (A) and 44' (B) indicate differentiated signals which are obtained by differentiating the envelopes 43' (A) and 43' (B) in order to determine the delay times of the waves of those envelopes. The signals 44' (A) and 44' (B) are used to detect the zero-cross signals (corresponding to the peaks of the envelopes).

Figure 13:
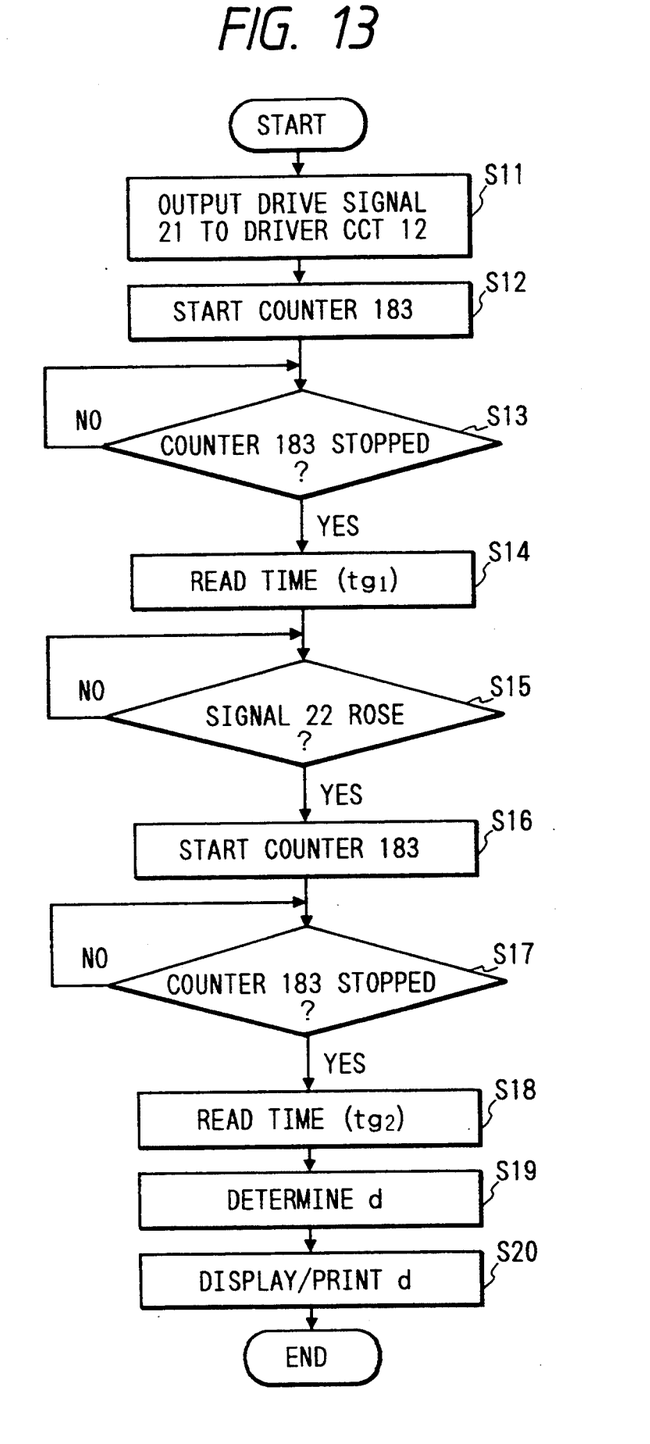
FIG. 13 is a diagram showing plate thickness measuring processes by a controller of the plate thickness measuring apparatus according to the second embodiment.

Due to this, the signal waveform detecting circuit 18 generates group delay times $t_{gn}$ for the driving signals to the controller 11 as signals indicative of the peak values of the envelopes of the detected signal waveforms, respectively. That is, the waveform detecting circuit 18 has the counter 183 to start the counting operation simultaneously with the timings at which the clock signals of different frequencies shown at 41' in FIG. 13 are generated from the driver circuit 12. A signal processing circuit 182 receives the detection signal 42' of the vibration sensor 16 for the clock signals of different frequencies and obtains the envelopes 43' (A) and 43' (B) of the detection signals 42' and generates zero-cross signals 44' (A) and 44' (B). When the zero-cross signals are received, the counter 182 finishes the counting operation and generates the count value to the controller 11.

FIG. 13 is a flowchart showing the plate thickness measuring processes in the controller 11 of the embodiment. A control program to execute those processes has been stored in an ROM (not shown) of the controller 11 or the like.

In the plate thickness measuring processing routine, the driving signal 21 to drive the oscillator 201 of the driver circuit 12 is first supplied to the driver circuit 12 in step S11. The counter 183 is activated in step S12 and the counting operation of the counter 183 is started. In step S13, the apparatus waits for the stop of the counting operation of the counter 183. When the counter 183 finishes the counting operation, step S14 follows and the count value is read. The time $t_{g1}$ shown in FIG. 12 is read as a count value.

In the next step S15, a signal 22 from the driver circuit 12 is received and a leading timing of the signal 22 is detected. When the signal 22 rises, step S16 follows and the counting operation by the counter 183 is started because it indicates the output timing of the clock signal ($f_2$) shown in FIG. 13. The apparatus waits for the stop of the counting operation of the counter 183 in step S17. When the counter 183 stops the counting operation, step S18 follows and the count value ($t_{g2}$ in FIG. 13) is read.

In step S19, a difference ($t_{g2}-t_{g1}$) between the above time data is calculated and the predetermined frequencies ($f_1$, $f_2$) are multiplied with the elapsed times ($t_{g1}/t_{g2}$) corresponding to them, thereby obtaining the group velocities ($f_1 \cdot t_{g1}$, $f_2 \cdot t_{g2}$) corresponding to those frequencies. By substituting the times and group velocities obtained as mentioned above into the equation (4) mentioned above, the thickness of plate material 17 as a measuring object is obtained. In the next step S20, the calculated plate thickness is sent to the output unit 19 and is displayed or printed.

The invention can be applied to a system comprising a plurality of apparatuses or can also be applied to an apparatus comprising one apparatus. The invention can also be obviously applied to the case where the invention is accomplished by supplying a program to execute the processes specified by the invention to the system or apparatus.

According to the second embodiment as described above, since there is no need to previously decide the distance between the vibration pen 20 and the vibration sensor 16, the pen 20 and sensor 16 can be put at arbitrary positions of the measuring object and the plate thickness can be measured. Moreover, an excellent effect such that the apparatus can be constructed by low costs is obtained.

We claim:

1. A measuring apparatus for measuring the thickness of a plate material, said apparatus comprising:
    vibration generating means for generating a lamb wave by applying a vibration to a plate material;
    detecting means disposed at an arbitrary position on the plate material for detecting the lamb wave which has propagated on the plate material;
    extracting means for extracting a plurality of lamb wave components having different frequencies from the lamb wave detected by said detecting means;
    measuring means for measuring a time difference between arrival times to said detecting means of the plurality of lamb wave components extracted by said extracting means; and
    calculating means for calculating the thickness of the plate material based on the time difference measured by said measuring means and velocities of the plurality of lamb wave components corresponding to the arrival times.

2. A measuring method of measuring the thickness of a plate material, comprising the steps of:
    generating a lamb wave by applying a vibration to a plate material;
    detecting a lamb wave which has propagated on the plate material and extracting a plurality of lamb wave components having different frequencies from the detected lamb wave, using a detector disposed at an arbitrary position on the plate material;
    measuring a time difference between arrival times to the detector of the plurality of lamb wave components extracted in said detecting and extracting step; and
    calculating the thickness of the plate material based on the measured time difference and velocities of the plurality of lamb wave components corresponding to the arrival times.

3. A measuring apparatus for measuring the thickness of a plate material, said apparatus comprising:
    vibration generating means for generating lamb waves by time sequentially applying vibrations of different frequencies to a plate material;
    detecting means, disposed at an arbitrary position on the plate material, for detecting the lamb waves which have propagated on the plate material;
    measuring means for measuring arrival times of the vibrations of the different frequencies of the lamb waves detected by said detecting means; and
    calculating means for calculating the thickness of the plate material based on the arrival times measured by said measuring means and the frequencies corresponding to the arrival times.

4. A measuring method of measuring the thickness of a plate material, comprising the steps of:
    generating lamb waves by applying vibrations of different frequencies to a plate material;
    detecting the plate waves which have propagated on the lamb material and measuring arrival times corresponding to the vibrations of the different frequencies; and
    calculating the thickness of the plate material based on the arrival times measured and the frequencies of the vibrations corresponding to the arrival times.

* * * * *

UNITED STATES PATENT AND TRADEMARK OFFICE
CERTIFICATE OF CORRECTION

PATENT NO. : 5,438,872
DATED : August 8, 1995
INVENTOR(S) : Kobayashi et al.

It is certified that error appears in the above-indentified patent and that said Letters Patent is hereby corrected as shown below:

COLUMN 5:

Line 21, "$\beta$" should read --$\beta$:--.

COLUMN 9:

Line 30, $(t_{g1}/t_{g2})$ should read --$t_{g1}, t_{g2})$.

COLUMN 10:

Line 54, "plate" should read --lamb--.
Line 55, "lamb" should read --plate--.

Signed and Sealed this

Second Day of January, 1996

Attest:

BRUCE LEHMAN

*Attesting Officer*  *Commissioner of Patents and Trademarks*